(12) United States Patent
Fujishiro

(10) Patent No.: US 7,362,460 B1
(45) Date of Patent: Apr. 22, 2008

(54) TECHNIQUES FOR MANAGING AUTOMATIC FOLDING FUNCTIONALITY IN FACSIMILE PROTOCOL

(75) Inventor: Toshihisa Fujishiro, San Jose, CA (US)

(73) Assignee: Ricoh Corporation, West Caldwell, NJ (US)

( * ) Notice: Subject to any disclaimer, the term of this patent is extended or adjusted under 35 U.S.C. 154(b) by 1031 days.

(21) Appl. No.: 10/426,706

(22) Filed: Apr. 29, 2003

(51) Int. Cl.
*G06F 15/00* (2006.01)
*H04N 1/00* (2006.01)
*H04N 1/32* (2006.01)

(52) U.S. Cl. .................. 358/1.15; 358/434; 358/442

(58) Field of Classification Search ............... 358/1.15, 358/400, 442, 468, 434, 296, 435, 436, 437, 358/402, 444
See application file for complete search history.

(56) References Cited

U.S. PATENT DOCUMENTS

| | | | |
|---|---|---|---|
| 5,390,910 A * | 2/1995 | Mandel et al. ............... | 271/296 |
| 5,513,013 A | 4/1996 | Kuo | |
| 5,678,135 A * | 10/1997 | Fukui et al. .................. | 399/77 |
| 6,324,187 B1 * | 11/2001 | Watanabe et al. ............ | 370/522 |
| 2002/0033569 A1 * | 3/2002 | Watanabe ..................... | 270/37 |
| 2003/0090739 A1 * | 5/2003 | Yoshida ........................ | 358/405 |
| 2003/0179417 A1 * | 9/2003 | Yoshida ........................ | 358/400 |

OTHER PUBLICATIONS

Department of Defense Interface Standard, "Interoperability and Performance Standards for Digital Facsimile Equipment", Mar. 19, 2001, MIL-STD-188-161D, 129 pages.

International Telecommunication Union, "ITU-T Recommendation T.30: Procedures for document facsimile transmission in the gneeral switched telephone network," Apr. 1999, pp. 1-290 (text provided on CD-ROM).

International Telecommunication Union, "ITU-T Recommendation T.30: Procedures for document facsimile transmission in the general switched telephone network," Jul. 2003, pp. 1-321 (text provided on CD-ROM).

* cited by examiner

*Primary Examiner*—Madeleine A V Nguyen
(74) *Attorney, Agent, or Firm*—Hickman Palermo Truong & Becker LLP

(57) ABSTRACT

Support for automatic folding functionality in facsimile ("fax") machines is described. In one aspect, a method for managing folding by a fax machine comprises sending a signal from a receiver fax machine ("receiver") indicating that the receiver has folding capability. The receiver receives a signal that commands the receiver to enable its folding capability. In embodiments, the capability indication and the enable command are represented of single bits of information in the respective signals. In one embodiment in which the signals are in accordance with ITU-T Recommendation T.30, the capability indication and enable command utilize bit number 30 of the Digital Identification Signal (DIS). In one embodiment in which the signals are in accordance with MIL-STD-188-161D, the capability indication and enable command utilize bit number 12 of respective receiver and sender signals.

38 Claims, 6 Drawing Sheets

SENDER 102      RECEIVER 104

CNG: Calling Tone
CED: Called Station Identification
NSF: Non-Standard Facilities
CSI: Called Subscriber Identification
DIS: Digital Identification
DCS: Digital Command Signal
TCF: Training Check
CFR: Confirmation to Receive
EOP: End of Procedures
MCF: Message Confirmation
DCN: Disconnect

TECHNIQUES FOR MANAGING AUTOMATIC FOLDING FUNCTIONALITY IN FACSIMILE PROTOCOL

FIELD OF THE INVENTION

The present invention relates generally to facsimile systems and, more specifically, to techniques for requesting and managing an automatic paper folding function via a facsimile protocol.

BACKGROUND OF THE INVENTION

Facsimile machines, commonly referred to as fax machines, have become a ubiquitous piece of equipment in offices and office and mail service environments around the world. Automatic paper and letter folding machines co-exist with fax machines in some environments. However, fax and paper folding machines co-exist independently in such environments.

Currently, if one were to receive a fax document that subsequently needs to be processed in some manner entailing folding, the received document requires either manual folding or manual movement from the fax output box or tray to a paper folding machine. Manual movement may entail a hand-carry or perhaps a conveyor between the two machines. For example, it may be desirable to mail a received fax document to a postal recipient, whereby the document might require folding and insertion into an envelope for mailing.

The folding process may be performed manually, or automatically via a folding machine. Regardless of the folding process, at least one step is involved in transferring the document from the fax machine to a folding mechanism. If utilizing a folding machine, additional steps may be required to program the machine to specify a desired manner of folding. For example, a paper may be folded in the following manners: bi-fold, letter fold, accordion fold, brochure fold, double fold, french fold, etc.

In bulk or mass distribution scenarios, a third party such as a mailing or office service provider may provide the service of folding papers, stuffing envelopes and mailing distributions. In such a scenario, the service provider would either (1) receive a single fax of a document with directions as to whom it should be mailed, whereupon the provider would copy, fold, stuff and mail multiple copies, with or without the assistance of a folding machine; or (2) receive multiple fax copies of a document, whereupon the provider would fold, stuff and mail the copies. In either case, the folding task may be performed manually or with the assistance of a folding machine.

In the foregoing scenarios, a mailing or office service provider may utilize an inserting machine for inserting the folded sheets of paper into envelopes prior to mailing. Inserting machines are separate stand-alone machines that are not physically or functionally integrated with a fax machine or a folding machine.

Currently, there are no known machines that integrate facsimile and folding functionalities. Furthermore, there are no known machines that integrate facsimile, folding and/or inserting functionalities.

Hence, based on the foregoing, there is a clear need for folding functionality in fax machines.

SUMMARY OF EMBODIMENTS OF THE INVENTION

Support for automatic folding functionality in facsimile ("fax") machines is described.

In one aspect, a method for requesting folding from a fax machine comprises receiving a signal from a receiver fax machine ("receiver") indicating that the receiver has folding capability. In an embodiment, the signal is sent from the receiver in response to a signal received by the receiver from a sender fax machine ("sender") that initiates a facsimile transmission. In turn, a signal that commands the receiver to enable its folding capability is sent to the receiver.

In embodiments, the capability indication and the enable command consist of single bits of information in the respective signals. For example, in an embodiment in which the signals are in accordance with or compliant with ITU-T (Telecommunication Standardization Sector of International Telecommunication Union) Recommendation T.30, the capability indication utilizes bit number 30 of the Digital Identification Signal (DIS). Similarly, the enable command utilizes bit number 30 of the Digital Command Signal (DCS). For another example, in an embodiment in which the signals are in accordance with or compliant with MIL-STD-188-161D, the capability indication and enable command utilize bit number 12 of respective receiver and sender signals.

In one aspect, a method for managing folding by a fax machine, at a receiver, comprises sending a signal from the receiver to a sender indicating that the receiver has folding capability. In an embodiment, the signal is sent from the receiver in response to a signal that initiates a facsimile transmission, received by the receiver from the sender. A signal that commands enablement of folding capability is received by the receiver. Data is received by the receiver and information represented by the data is printed on a sheet of some medium, such as paper. Further, the sheet of medium is folded in response to the enablement command signal.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques for facilitating automatic folding functionality in facsimile ("fax") machines are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OPERATING ENVIRONMENT

Figure 1:
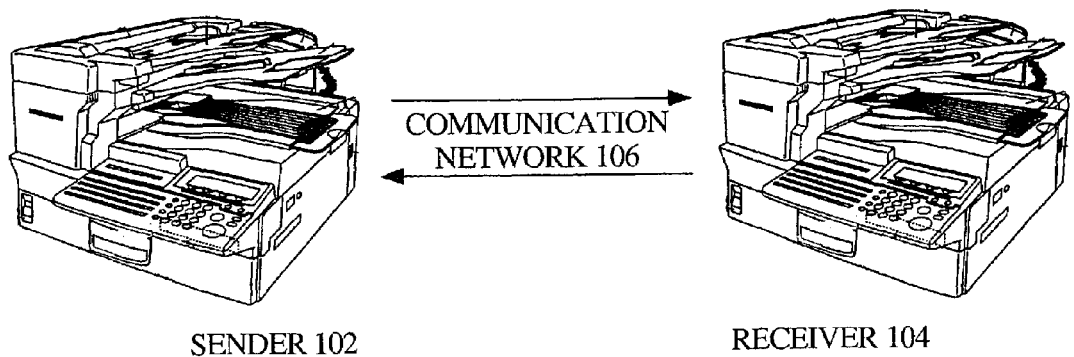
FIG. 1 is a block diagram that illustrates an example operating environment for techniques described herein.

FIG. 1 is a block diagram that illustrates an example operating environment for techniques described herein.

FIG. 1 illustrates a sender 102 communicatively coupled to a receiver 104 via a communication network 106. Each of sender 102 and receiver 104 represents a facsimile machine or terminal. More generally, each of sender 102 and receiver 104 may be an apparatus having facsimile capability. For example, sender 102 and receiver 104 may be systems comprising multiple components, such as a computer coupled to a scanner with fax capability.

By having fax capability, sender 102 and receiver 104 are able to exchange signals with each other and with other devices through network 106 using facsimile protocols. Two such fax protocols are, for example, (1) the Group 3 protocol specified in ITU-T Recommendation T.30, Procedures For Document Facsimile Transmission In The General Switched Telephone Network, which is incorporated by reference in its entirety for all purposes as if fully disclosed herein; and (2) MIL-STD-188-161D, Department of Defense Interface Standard, Interoperability And Performance Standards For Digital Facsimile Equipment, which is incorporated by reference in its entirety for all purposes as if fully disclosed herein. However, unless otherwise stated, embodiments of the invention are not limited to the foregoing protocols, for techniques described herein can be implemented within any present or future fax protocol. Furthermore, these techniques may be implemented within Internet Protocol (IP) based fax protocols to support fax transmissions over the Internet.

Communication network 106 is any network suitable for exchanging messages via signals. For example, network 106 may be the PSTN (Public Switched Telephone Network), leased circuits, ISDN (Integrated Services Digital Network), the Internet, cellular networks, satellite networks, wireless networks (e.g., IEEE 802.11 LANs) and the like. Different fax protocols are typically used for communicating via different types of communication networks.

Both sender 102 and receiver 104 are capable of processing at least control, command, data and other types of signals for sending and receiving fax transmissions. Processing such signals includes processing signals that contain information specific to embodiments, that is, information for facilitating requests for and management of folding functionality. However, only receiver 104 necessarily needs automatic folding capabilities. Thus, sender 102 may be capable of requesting folding functionality from receiver 104 without having the same folding functionality.

Although not visually illustrated in FIG. 1, receiver 104 includes a mechanism for folding a medium on which information can be printed. The medium on which information can be printed may be, for non-limiting examples, paper, cardboard, plastic, mylar, and the like. Such a folding mechanism may be integrated within the receiver 104 machine or communicatively coupled to the receiver 104 such that signals can be exchanged between the receiver and the folding mechanism. Furthermore, sender 102 and receiver 104 may include some form of user interface or display, such as an LCD, for displaying information to a user. Still further, sender 102 and receiver 104 may include a push button, for facilitating initiation by a user of the techniques described herein. For example, an "automatic paper folding" button may, when depressed, initiate a method for requesting folding from a machine having folding capability, such as receiver 104.

SYSTEM FOR MANAGING AUTOMATIC FOLDING BY A FACSIMILE MACHINE

Figure 2:
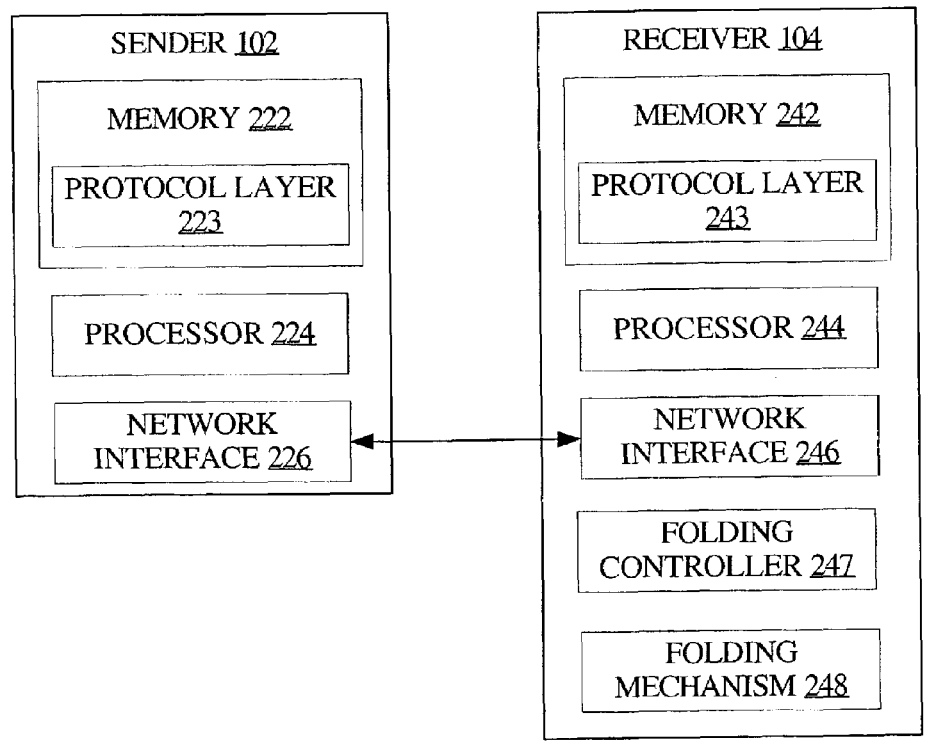
FIG. 2 is a block diagram that illustrates components of a sender fax machine and a receiver fax machine.

FIG. 2 is a block diagram that illustrates an example of pertinent components of sender 102 and receiver 104.

Sender 102 comprises memory 222, a processor 224 and a network interface 226. Similarly, receiver 104 comprises memory 242, a processor 244 and a network interface 246. These respective components of sender 102 and receiver 104 are conventional components, without specific limitations or requirements unless otherwise described. Thus, memory 222, 242; processor 224, 244; and network interface 226, 246 are herein described collectively for both sender 102 and receiver 104. The functionality of each of the respective components is similar, with respect to their relevance to the techniques described herein. However, the respective components need not be physically identical.

Memory 222, 242 is conventional memory, such as a random access memory (RAM) or other dynamic storage device, for storing information and instructions to be executed by processor 224, 244. Memory 222, 242 also may be used for storing temporary variables or other intermediate information during execution of instructions to be executed by processor 224, 244. Memory 222, 242 further includes a read only memory (ROM) or other static storage device for storing static information and instructions for execution by processor 224, 244.

Memory 222, 242 further comprises protocol layer 223, 243, respectively. Protocol layer 223, 243 is a set of one or more instructions, e.g., a software module, for processing communication signals according to one or more facsimile protocols. Sender 102 and receiver 104 may each comprise one or more protocol layers 223, 243 that provide the logic to communicate with other devices according to one or more facsimile protocols. Communicating according to a given protocol means that a device can interpret incoming signals based on the given protocol and generate outgoing signals based on the given protocol.

In an embodiment, protocol layer 223, 243 comprises instructions and logic for interpreting and generating signals that are in compliance with MIL-STD-188-161D, Department of Defense Interface Standard, Interoperability And Performance Standards For Digital Facsimile Equipment. Further, in an embodiment, protocol layer 223, 243 comprises instructions and logic for interpreting and generating signals that are in compliance with the Group 3 protocol specified in ITU-T Recommendation T.30, Procedures For Document Facsimile Transmission In The General Switched Telephone Network. A given sender 102 or receiver 104 may comprise protocol layers 223, 243 applicable to facsimile protocols other than the foregoing two protocols. Furthermore, a given sender 102 or receiver 104 may comprise protocol layers 223, 243 applicable to multiple protocols. That is, a given fax machine may have the capability to communicate using more than one protocol. Protocol layer 223, 243 facilitates the exchange of signals described in reference to FIG. 3 and FIG. 4.

Processor 224, 244 executes one or more sequences of one or more instructions contained in memory 222, 242. Such instructions may be read into memory 222, 242 from another computer-readable medium, such as a storage device. Execution of the sequences of instructions contained in memory 222, 242 causes processor 224, 244 to perform the process steps described herein, and to perform the signal interpretation and generation associated with protocol layer 223, 243.

Network interface 226, 246 provides a two-way data communication coupling to a network link that is connected to communication network 106 (FIG. 1). For example, network interface 226, 246 may comprise an integrated services digital network (ISDN) card or a modem to provide a data communication connection to a corresponding type of telephone line. As another example, network interface 226, 246 may be a local area network (LAN) card to provide a data communication connection to a compatible LAN. Wireless links may also be implemented. In any such implementation, network interface 226, 246 sends and receives electrical, electromagnetic or optical signals that carry digital data streams representing various types of information.

Network interface 226, 246 typically provides data communication through one or more networks, such as network 106, to other data devices. Sender 102 and receiver 104 can send messages and receive data, including program code, through network 106 and network interface 226, 246.

Receiver 104 further comprises a folding controller 247 and a folding mechanism 248. Folding controller 247 is a control unit that controls the folding mechanism 248. For example, a command signal for enabling the folding function may be generated by processor 244 (perhaps in response to a enable command signal received from sender 102) and sent to folding controller 247 where, in turn, folding controller 247 starts and controls the mechanical process of folding a print media. For examples, folding controller 247 may be a specialized microprocessor, logic embedded in processor 244, or software code stored in memory 222 and executed by processor 244.

Folding mechanism 248 provides the mechanics for automatically physically folding media on which information can be printed. Folding mechanism 248 further comprises an electronic or electromechanical interface for receiving and transmitting signals to and from memory 242, processor 244, and/or folding controller 247. The actual mechanical configuration and operational mechanics of folding mechanism 248 is not important and can vary from implementation to implementation and, therefore, does not limit embodiments of the invention. As mentioned in reference to FIG. 1, folding mechanism 248 may be integrated within the hardware of receiver 104 or communicatively coupled to the receiver 104 such that signals can be exchanged therebetween.

METHOD FOR REQUESTING FOLDING FROM A FACSIMILE MACHINE

Figure 3:
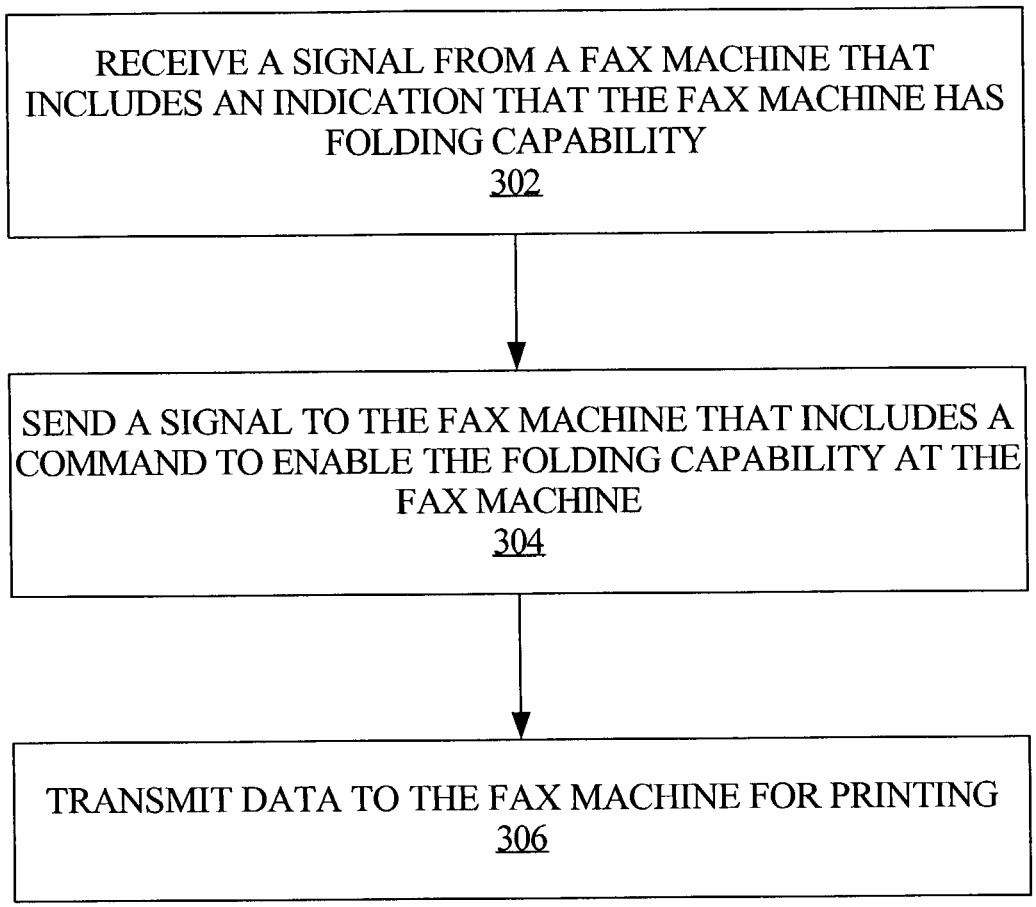
FIG. 3 is a flow diagram that illustrates a method for requesting folding from a facsimile machine having folding functionality.

FIG. 3 is a flow diagram that illustrates a method for requesting folding from a facsimile machine having folding functionality. A sender fax machine, such as sender 102 of FIG. 1 and FIG. 2, typically performs the method of FIG. 3.

At block 302, one or more signals are received from a fax machine having folding functionality. For example, a "capability" signal is received from a receiver fax machine, such as receiver 104 (FIG. 1), sent in response to one or more signals that initiate a facsimile process, such as from a sender fax machine like sender 102 (FIG. 1) or a suitable proxy. Such one or more signals or such a facsimile process may be initiated, for example, via a push button on a console of a sender fax machine, such as sender 104. The capability signal(s) received from the receiver include an indication that the receiver has the capability of folding a medium on which information can be printed, such as paper, cardboard, etc.

In an embodiment, the indication encapsulated in the capability signal(s) consists of a single bit of information. Hence, a zero or one is used to indicate whether the receiver has folding capability or not.

Figure 5A:
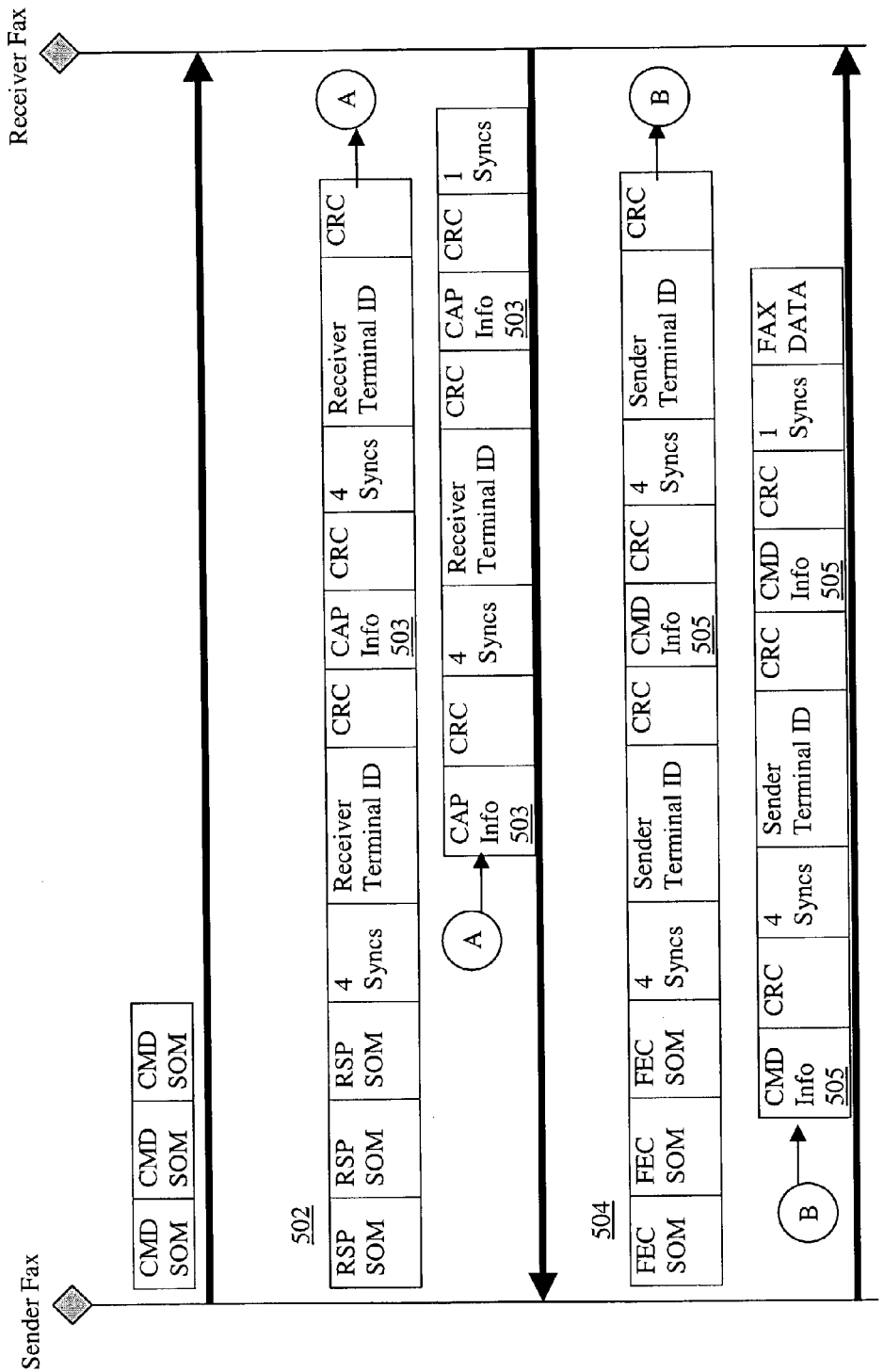
FIG. 5A is a diagram that illustrates an exchange of signals between a sender fax machine and a receiver fax machine, according to the MIL-STD-188-161D protocol.

In an embodiment, the capability signal(s) are in accordance with MIL-STD-188-161D. In a related embodiment, bit number 12 of a signal exchanged from a receiver fax machine to a sender fax machine includes the indication that the receiver has folding functionality. FIG. 5A is a diagram that illustrates an exchange of signals between a sender fax machine and a receiver fax machine, according to the MIL-STD-188-161D protocol. In FIG. 5A, the signal 502 represents the signal sent from the receiver to the sender. The fields 503 labeled "CAP Info" represent the redundant signal fields that include the indication of folding capability received at block 302.

Figure 5B:
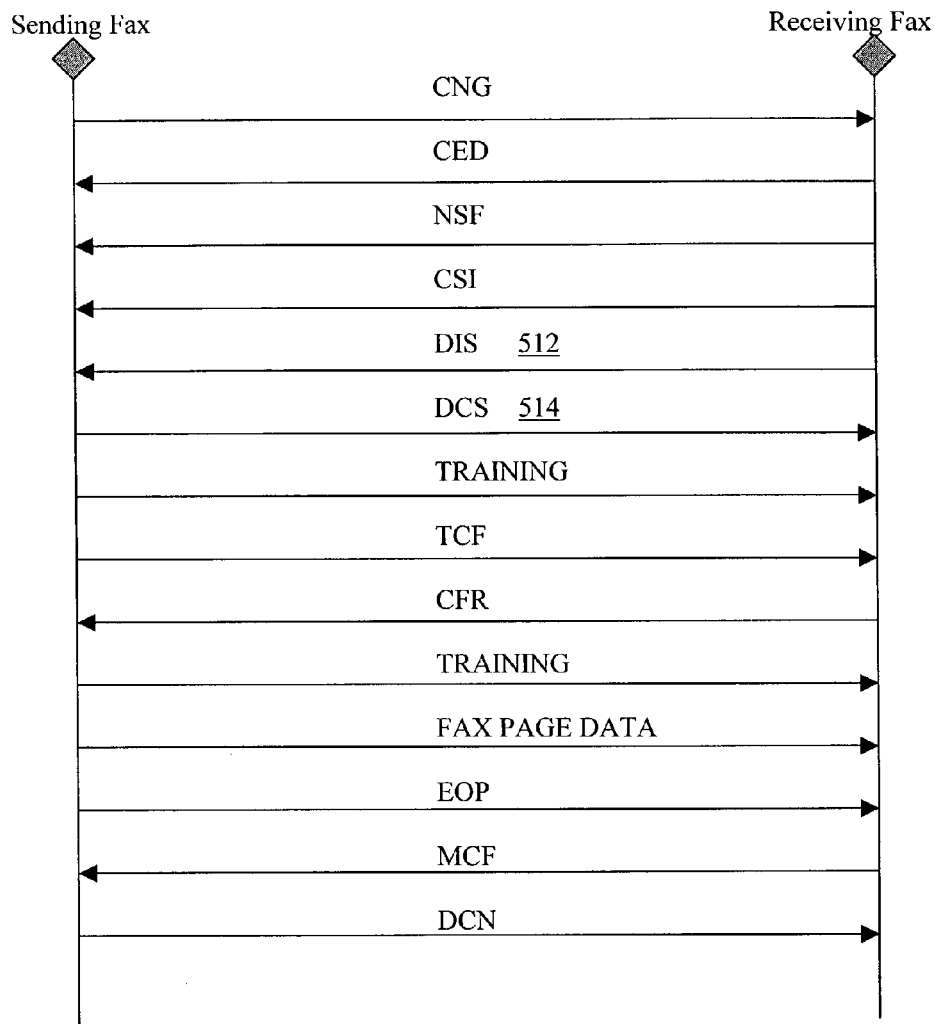
FIG. 5B is a diagram that illustrates an exchange of signals between a sender fax machine and a receiver fax machine, according to the Group 3 protocol specified in ITU-T Recommendation T.30.

In another embodiment, the capability signal(s) are in compliance with the Group 3 protocol specified in ITU-T Recommendation T.30. In a related embodiment, the capability signal(s) are a Digital Identification Signal (DIS), as defined by the referenced protocol standard. In a related embodiment, bit number 30 of a DIS signal includes the indication that the receiver has folding functionality. FIG. 5B is a diagram that illustrates an exchange of signals between a sender fax machine and a receiver fax machine, according to the Group 3 protocol specified in ITU-T Recommendation T.30. In FIG. 5B, the signal 512 labeled "DIS" represents Digital Identification Signal, which includes the indication of folding capability received at block 302.

At block 304, one or more signals are sent to the fax machine that has folding functionality. The signals include a command to enable the folding capability at the fax machine. For example, a "command" signal is sent from a sender fax machine, such as sender 102 (FIG. 1), to a receiver fax machine like receiver 104 (FIG. 1) or a suitable proxy.

In an embodiment, the enable command encapsulated in the command signal(s) consists of a single bit of information. Hence, a zero or one is used to command the receiver fax machine with folding capability to enable its folding capability for the fax transmission.

In an embodiment, the command signal(s) are in accordance with MIL-STD-188-161D. In a related embodiment, bit number 12 of a signal exchanged from a sender fax machine to a receiver fax machine includes the automatic folding capability enable command. In FIG. 5A, the signal 504 represents the signal sent from the sender to the receiver. The fields 505 labeled "CMD Info" represent the redundant signal fields that include the folding enable command sent at block 304.

In another embodiment, the command signal(s) are in compliance with the Group 3 protocol specified in ITU-T Recommendation T.30. In a related embodiment, the command signal(s) are a Digital Command Signal (DCS), as defined by the referenced protocol standard. In a related embodiment, bit number 30 of a DCS signal includes the automatic folding enable command. In FIG. 5B, the signal 514 labeled "DCS" represents Digital Command Signal, which includes the folding enable command sent at block 304.

At block 306, data is transmitted to the fax machine for printing. For example, the sender 102 transmits to the receiver 104, through communication network 106 (FIG. 1), coded data that embodies the information that is being faxed. In turn, the receiver receives the data, decodes it and prints it on a suitable medium, such as a sheet of paper. Subsequently, the receiver machine utilizes its folding functionality to fold the sheet of medium, in response to the enable command.

To summarize the method of FIG. 3, a communication technique is described which facilitates a request for folding, wherein the request is made to a fax machine having folding functionality, through the exchange of electronic signals.

METHOD FOR MANAGING FOLDING BY A FACSIMILE MACHINE

Figure 4:
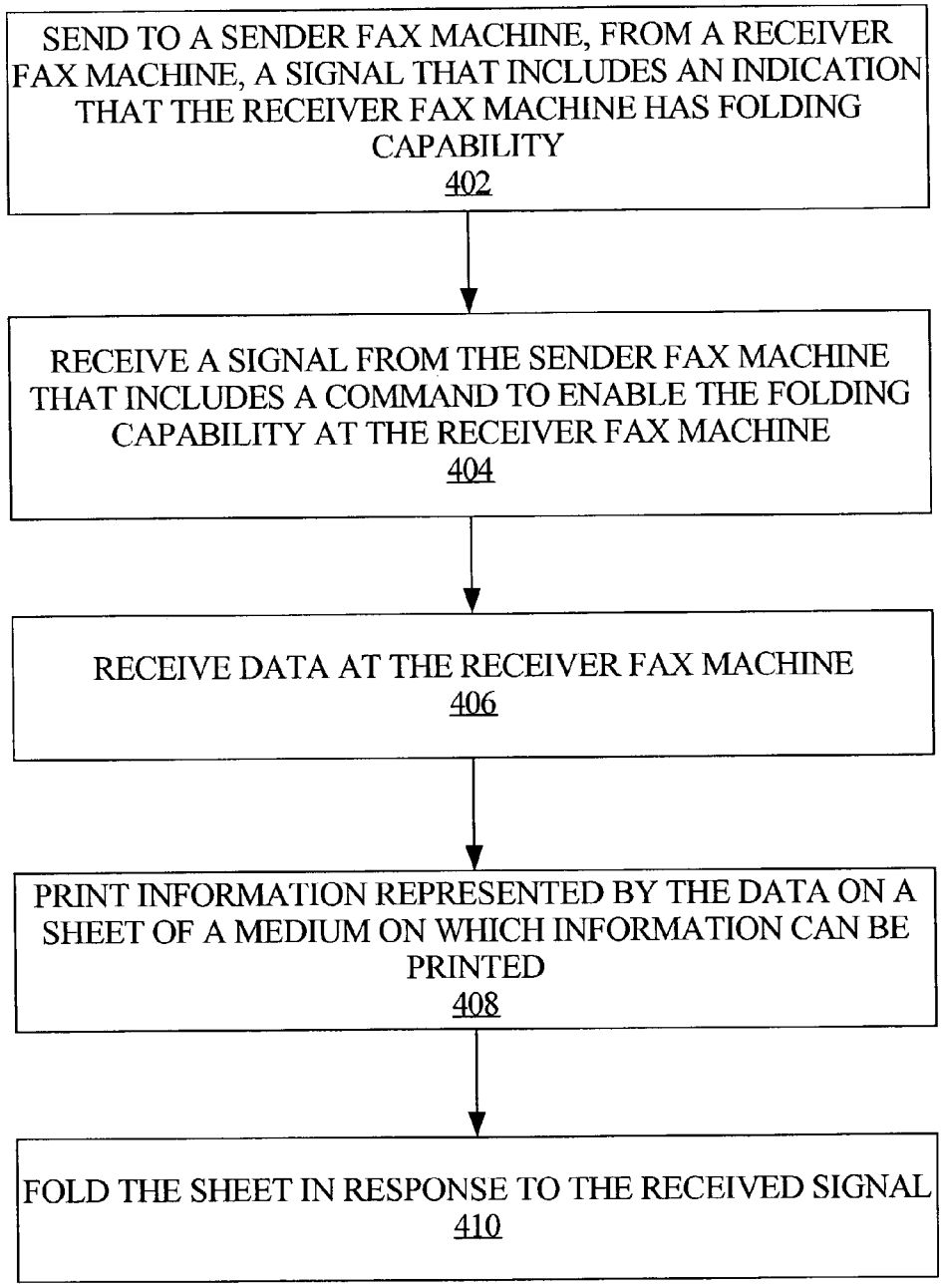
FIG. 4 is a flow diagram that illustrates a method for managing folding by a facsimile machine having folding functionality.

FIG. 4 is a flow diagram that illustrates a method for managing folding by a facsimile machine having folding functionality. A receiver fax machine, such as receiver 104 of FIG. 1 and FIG. 2, typically performs the method of FIG. 4.

At block 402, one or more signals are sent from a fax machine having folding functionality. For example, a "capability" signal is sent from a receiver fax machine, such as receiver 104 (FIG. 1), to a sender fax machine, such as sender 102 (FIG. 1). In one embodiment, the one or more signals sent at block 402 are in response to one or more signals that initiate a facsimile transmission of data, such as from a sender fax machine like sender 102 (FIG. 1) or a suitable proxy. The capability signal(s) sent by the receiver include an indication that the receiver has the capability of folding a medium on which information can be printed, such as paper, cardboard, etc.

In an embodiment, the indication encapsulated in the capability signal(s) consists of a single bit of information. Hence, a zero or one is used to indicate whether the receiver has folding capability or not.

In an embodiment, the capability signal(s) are in accordance with MIL-STD-188-161D. In a related embodiment, bit number 12 of a signal exchanged from a receiver fax machine to a sender fax machine includes the indication that the receiver has folding functionality. In FIG. 5A, the signal 502 represents the signal sent from the receiver to the sender. The fields 503 labeled "CAP Info" represent the redundant signal fields that include the indication of folding capability sent at block 402.

In another embodiment, the capability signal(s) are in compliance with the Group 3 protocol specified in ITU-T Recommendation T.30. In a related embodiment, the capability signal(s) are a Digital Identification Signal (DIS), as defined by the referenced protocol standard. In a related embodiment, bit number 30 of a DIS signal includes the indication that the receiver has folding functionality. In FIG. 5B, the signal 512 labeled "DIS" represents Digital Identification Signal, which includes the indication of folding capability sent at block 402 sent at block 402.

At block 404, one or more signals are received by the fax machine that has folding functionality. The signals include a command to enable the folding capability at the fax machine. For example, a "command" signal is sent from a sender fax machine, such as sender 102 (FIG. 1), to a receiver fax machine like receiver 104 (FIG. 1) or a suitable proxy.

In an embodiment, the enable command encapsulated in the command signal(s) consists of a single bit of information. Hence, a zero or one is used to command the receiver fax machine with folding capability to enable its folding capability for the fax transmission.

In an embodiment, the command signal(s) are in accordance with MIL-STD-188-161D. In a related embodiment, bit number 12 of a signal exchanged from a sender fax machine to a receiver fax machine includes the automatic folding capability enable command. In FIG. 5A, the signal 504 represents the signal received by the receiver from the sender at block 404. The fields 505 labeled "CMD Info" represent the redundant signal fields that include the folding enable command received at block 404.

In another embodiment, the command signal(s) are in compliance with the Group 3 protocol specified in ITU-T Recommendation T.30. In a related embodiment, the command signal(s) are a Digital Command Signal (DCS), as defined by the referenced protocol standard. In a related embodiment, bit number 30 of a DCS signal includes the automatic folding enable command. In FIG. 5B, the signal 514 labeled "DCS" represents Digital Command Signal, which includes the folding enable command received at block 404.

At block 406, data is received at the fax machine, for printing. For example, the receiver 104 receives from sender 102, through communication network 106 (FIG. 1), coded data that embodies the information that is being faxed.

At block 408, the information represented by the data received at block 406 is printed on a sheet of a suitable medium on which information can be printed. For example, receiver 104 prints the information of a sheet of paper, cardboard, mylar or the like.

At block 410, the sheet of medium on which the information was printed at block 408 is folded, in response to the enable command received at block 404.

To summarize the method of FIG. 4, a communication technique is described which facilitates management of automatic folding, by a fax machine having folding functionality, through the exchange of electronic signals.

More generally, a fax protocol-based technique is provided for requesting, enabling and managing any of various supplemental post-processing capabilities that facsimile machines may offer, now and in the future. For example, the techniques described herein are applicable for enabling and managing automatic inserting (i.e., envelope inserting), labeling and stamping functionalities provided by a fax machine.

HARDWARE OVERVIEW

Figure 6:
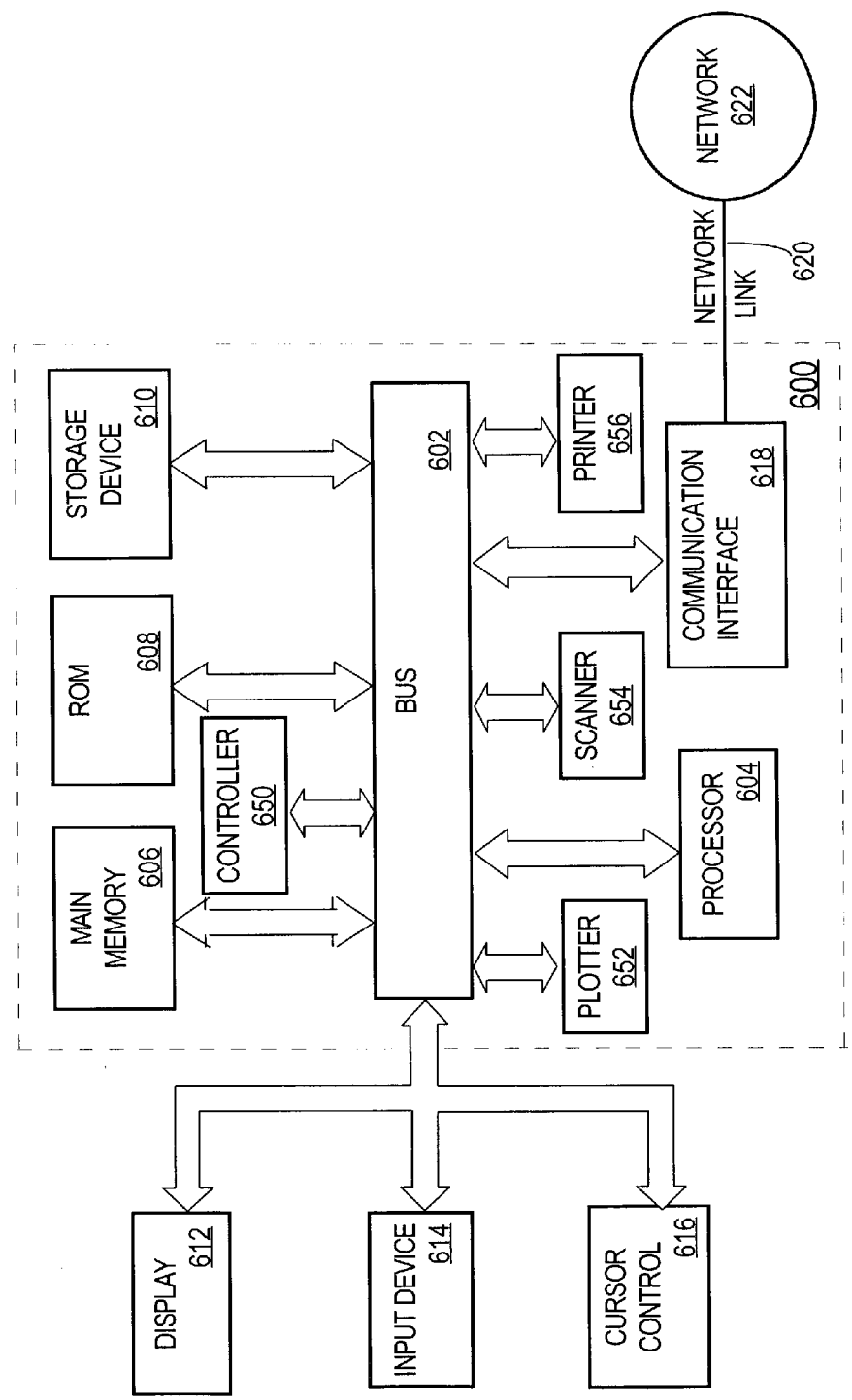
FIG. 6 is a block diagram that illustrates a system upon which an embodiment of the invention may be implemented.

FIG. 6 is a block diagram that illustrates a system 600 upon which an embodiment of the invention may be implemented. System 600 represents a generalized computing system and, therefore, implementations of the techniques described herein may vary from system 600. Hence, some components illustrated in system 600 may be eliminated, or others added, in implementations of these techniques. A preferred embodiment is implemented using one or more sequences of instructions executing on a facsimile machine. Thus, in this embodiment, system 600 is a facsimile machine.

System 600 includes a bus 602 or other communication mechanism for communicating information, and a processor 604 coupled with bus 602 for processing information. System 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. System 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

System 600 may be coupled via bus 602 to a display 612, such as a cathode ray tube (CRT), for displaying information to a user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of system 600 for requesting folding from and managing folding by a facsimile machine having folding functionality. According to one embodiment of the invention, the techniques described herein are provided by system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

System 600 also includes a communication interface 618 coupled to bus 602. Communication interface 618 provides a two-way data communication coupling to a network link 620 that is connected to a network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through network 622 to another facsimile device. Network 622 uses electrical, electromagnetic or optical signals that carry digital data streams. The signals through the various networks and the signals on network link 620 and through communication interface 618, which carry the digital data to and from system 600, are exemplary forms of carrier waves transporting the information.

System 600 can send messages and receive data, including program code, through the network(s), network link 620 and communication interface 618. For example, a server might transmit a requested code for an application program through the Internet, network 622 and communication interface 618. In accordance with the invention, one such downloaded application provides for requesting folding from or managing folding by a facsimile machine having folding functionality, as described herein.

The received code may be executed by processor 604 as it is received, and/or stored in storage device 610, or other non-volatile storage for later execution. In this manner, system 600 may obtain application code in the form of a carrier wave.

System 600 further includes a controller 650 for controlling at least the folding mechanism 248 (FIG. 2) and process, according to embodiments described herein. Controller 650 includes a folding controller, such as controller 247 (FIG. 2) and may be a specialized microprocessor, embedded code, or a processor that executes code stored in memory 606, for example. Separate controllers, for example, a plotter controller, a scanner controller and a printer controller may be included to control functions and processes performed by a plotter 652, scanner 654, and/or printer 656, respectively. However, a system on which the techniques described herein are executed may vary from implementation to implementation. Hence, a single controller such as controller 650 may be used to control any or all of plotter 652, scanner 654, printer 656 and folding mechanism 248. Furthermore, plotter 652 and scanner 654 may not be present in an implementing system, such as a common computer system performing as a fax sender, such as sender 102 (FIG. 2). An automatic folding mechanism, such as folding mechanism 248 of receiver 104 of FIG. 2, may also be present in system 600.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, although the techniques are described solely in reference to folding functionality in a fax machine, other present and future post-processing functionalities and capabilities available from fax machines, such as envelope insertion, address labeling and stamping, can be managed using the techniques described herein. For another example, similar techniques, protocols, and bit fields may be applied for indicating and enabling different manners of folding, such as bi-fold, letter fold, accordion fold, brochure fold, double fold, french fold, etc. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for requesting folding from a facsimile machine having folding functionality, the method comprising the steps of:
   receiving one or more first signals from said facsimile machine, wherein said one or more first signals indicate that said facsimile machine has capability of folding a medium on which information can be printed;
   sending one or more second signals to said facsimile machine, wherein said one or more second signals include a command to enable said folding capability at said facsimile machine;
   wherein said one or more first signals and said one or more second signals are in accordance with ITU-T Recommendation T.30;
   wherein said one or more first signals are a Digital Identification Signal (DIS);
   wherein bit number 30 of said one or more first signals indicates that said facsimile machine has capability of folding.

2. The method of claim 1, further comprising the step of:
   transmitting data to said facsimile machine for printing, on a sheet of said medium, information represented by said data.

3. The method of claim 1, wherein the one or more first signals are sent in response to one or more third signals that are received by said facsimile machine, wherein said one or more third signals initiate a facsimile process.

4. The method of claim 1, wherein said command is represented by a single bit of information.

5. The method of claim 1, wherein a single bit of information is used to indicate that said facsimile machine has capability of folding.

6. The method of claim 1, wherein said one or more second signals are a Digital Command Signal (DCS).

7. The method of claim 6, wherein bit number 30 of said one or more second signals includes said command.

8. The method of claim 1, wherein said one or more first and second signals are in accordance with MIL-STD-188-161D.

9. The method of claim 8, wherein bit number 12 of said one or more first signals indicates that said facsimile machine has capability of folding.

10. The method of claim 8, wherein bit number 12 of said one or more second signals includes said command.

11. A method for managing folding by a facsimile machine having folding functionality, the method comprising the steps of:
    sending, from a receiver facsimile machine, one or more first signals to a sender facsimile machine, wherein said one or more first signals indicate that said receiver facsimile machine has capability of folding a medium on which information can be printed;
    receiving, at said receiver facsimile machine, one or more second signals from said sender facsimile machine, wherein said one or more second signals include a command to enable folding capability at said receiver facsimile machine;
    receiving data at said receiver facsimile machine;
    printing information represented by said data on a sheet of said medium; and
    folding said sheet of said medium in response to said one or more second signals;
    wherein said one or more first signals and said one or more second signals are in accordance with ITU-T Recommendation T.30;
    wherein said one or more first signals are a Digital Identification Signal (DIS);
    wherein bit number 30 of said one or more first signals indicates that said facsimile machine has capability of folding.

12. The method of claim 11, wherein the step of sending said one or more first signals is in response to receiving one or more third signals that initiate a facsimile process.

13. The method of claim 12, wherein said one or more third signals are received from said sender facsimile machine.

14. The method of claim 11, wherein said command is represented by a single bit of information.

15. The method of claim 11, wherein a single bit of information is used to indicate that said facsimile machine has capability of folding.

16. The method of claim 11, wherein said one or more second signals are a Digital Command Signal (DCS).

17. The method of claim 16, wherein bit number 30 of said one or more second signals includes said command.

18. The method of claim 11, wherein said one or more first and second signals are in accordance with MIL-STD-188-161D.

19. The method of claim 18, wherein bit number 12 of said one or more first signals is used to indicate that said facsimile machine has capability of folding.

20. The method of claim 18, wherein bit number 12 of said one or more second signals includes said command.

21. A method for requesting folding from a facsimile machine having folding functionality, the method comprising the steps of:

receiving one or more first signals from said facsimile machine, wherein said one or more first signals are in accordance with ITU-T Recommendation T.30 and indicate, using a single bit of information, that said facsimile machine has capability of folding a medium on which information can be printed; and sending one or more second signals to said facsimile machine, wherein said one or more second signals are in accordance with ITU-T Recommendation T.30 and include a command, which is represented by a single bit of information, to enable said folding capability at said facsimile machine;

wherein said one or more second signals are a Digital Command Signal (DCS);

wherein bit number 30 of said one or more second signals includes said command.

22. A method for managing folding by a facsimile machine having folding functionality, the method comprising the steps of:

sending, from a receiver facsimile machine, one or more first signals to a sender facsimile machine, wherein said one or more first signals are in accordance with ITU-T Recommendation T.30 and indicate, using a single bit of information, that said receiver facsimile machine has capability of folding a medium on which information can be printed;

receiving, at said receiver facsimile machine, one or more second signals from said sender facsimile machine, wherein said one or more second signals are in accordance with ITU-T Recommendation T.30 and include a command, which is represented by a single bit of information, to enable folding capability at said receiver facsimile machine;

receiving data at said receiver facsimile machine;

printing information represented by said data on a sheet of said medium; and folding said sheet of said medium in response to said one or more second signals;

wherein said one or more second signals are a Digital Command Signal (DCS);

wherein bit number 30 of said one or more second signals includes said command.

23. A computer-readable medium storing one or more sequences of instructions for requesting folding from a facsimile machine having folding functionality, wherein execution of the one or more sequences of instructions by one or more processors causes the one or more processors to perform the steps of:

receiving one or more first signals from said facsimile machine, wherein said one or more first signals indicate that said facsimile machine has capability of folding a medium on which information can be printed; and sending one or more second signals to said facsimile machine, wherein said one or more second signals include a command to enable said folding capability at said facsimile machine;

wherein said one or more first signals and said one or more second signals are in accordance with ITU-T Recommendation T.30;

wherein said one or more first signals are a Digital Identification Signal (DIS);

wherein bit number 30 of said one or more first signals indicates that said facsimile machine has capability of folding.

24. A computer-readable medium storing one or more sequences of instructions for managing folding by a facsimile machine having folding functionality, wherein execution of the one or more sequences of instructions by one or more processors causes the one or more processors to perform the steps of:

sending, from a receiver facsimile machine, one or more first signals to a sender facsimile machine, wherein said one or more first signals indicate that said receiver facsimile machine has capability of folding a medium on which information can be printed;

receiving, at said receiver facsimile machine, one or more second signals from said sender facsimile machine, wherein said one or more second signals include a command to enable folding capability at said receiver facsimile machine;

receiving data at said receiver facsimile machine;

printing information represented by said data on a sheet of said medium; and folding said sheet of said medium in response to said one or more second signals;

wherein said one or more first and second signals are in accordance with MIL-STD-188-161D.

25. The computer-readable medium of claim 24, wherein the step of sending said one or more first signals is in response to receiving one or more third signals that initiate a facsimile process.

26. The computer-readable medium of claim 25, wherein said one or more third signals are received from said sender facsimile machine.

27. The computer-readable medium of claim 24, wherein said command is represented by a single bit of information.

28. The computer-readable medium of claim 24, wherein a single bit of information is used to indicate that said facsimile machine has capability of folding.

29. The computer-readable medium of claim 24, wherein said one or more first signals and said one or more second signals are in accordance with ITU-T Recommendation T.30.

30. The computer-readable medium of claim 29, wherein said one or more first signals are a Digital Identification Signal (DIS).

31. The computer-readable medium of claim 30, wherein bit number 30 of said one or more first signals is used to indicate that said facsimile machine has capability of folding.

32. The computer-readable medium of claim 29, wherein said one or more second signals are a Digital Command Signal (DCS).

33. The computer-readable medium of claim 32, wherein bit number 30 of said one or more second signals includes said command.

34. The computer-readable medium of claim 24, wherein bit number 12 of said one or more first signals is used to indicate that said facsimile machine has capability of folding.

35. The computer-readable medium of claim 24, wherein bit number 12 of said one or more second signals includes said command.

36. A computer-readable medium for requesting folding from a facsimile machine having folding functionality, wherein execution of the one or more sequences of instructions by one or more processors causes the one or more processors to perform the steps of:

receiving one or more first signals from said facsimile machine, wherein said one or more first signals are in accordance with ITU-T Recommendation T.30 and indicate, using a single bit of information, that said facsimile machine has capability of folding a medium on which information can be printed; and sending one or more second signals to said facsimile machine, wherein said one or more second signals are in accordance with ITU-T Recommendation T.30 and include a command, which is represented by a single bit of information, to enable said folding capability at said facsimile machine;

wherein said one or more second signals are a Digital Command Signal (DCS) wherein bit number 30 of said one or more second signals includes said command.

37. A computer-readable medium for managing folding by a facsimile machine having folding functionality, wherein execution of the one or more sequences of instructions by one or more processors causes the one or more processors to perform the steps of:

sending, from a receiver facsimile machine, one or more first signals to a sender facsimile machine, wherein said one or more first signals are in accordance with ITU-T Recommendation T.30 and indicate, using a single bit of information, that said receiver facsimile machine has capability of folding a medium on which information can be printed;

receiving, at said receiver facsimile machine, one or more second signals from said sender facsimile machine, wherein said one or more second signals are in accordance with ITU-T Recommendation T.30 and include a command, which is represented by a single bit of information, to enable folding capability at said receiver facsimile machine;

receiving data at said receiver facsimile machine;

printing information represented by said data on a sheet of said medium; and folding said sheet of said medium in response to said one or more second signals;

wherein said one or more second signals are a Digital Command Signal (DCS);

wherein bit number 30 of said one or more second signals includes said command.

38. An apparatus that is a facsimile device that has a folding mechanism for folding a medium on which information can be printed, wherein the apparatus is capable of performing the steps of:

sending one or more first signals that indicate that said apparatus has capability of folding a medium on which information can be printed;

receiving one or more second signals that include a command to enable folding capability at said apparatus;

receiving data;

printing information represented by said data on a sheet of said medium; and folding said sheet of said medium in response to said one or more second signals;

wherein said one or more first signals and said one or more second signals are in accordance with ITU-T Recommendation T.30;

wherein said one or more first signals are a Digital Identification Signal (DIS);

wherein bit number 30 of said one or more first signals indicates that said facsimile machine has capability of folding.

* * * * *